(12) United States Patent
Hodges et al.

(10) Patent No.: US 8,391,786 B2
(45) Date of Patent: Mar. 5, 2013

(54) MOTION TRIGGERED DATA TRANSFER

(76) Inventors: Stephen Hodges, Cambridge (GB); Shahram Izadi, Cambridge (GB); David Alexander Butler, Great Cambourne (GB)

( * ) Notice: Subject to any disclaimer, the term of this patent is extended or adjusted under 35 U.S.C. 154(b) by 852 days.

(21) Appl. No.: 11/627,100

(22) Filed: Jan. 25, 2007

(65) Prior Publication Data

US 2008/0195735 A1 Aug. 14, 2008

(51) Int. Cl.
*H04H 20/71* (2008.01)
*H04B 7/00* (2006.01)
*G06F 15/16* (2006.01)

(52) U.S. Cl. .................. 455/41.2; 455/3.01; 709/232

(58) Field of Classification Search ............... 340/407.1, 340/571; 455/41.2, 557, 3.01; 370/328; 709/232
See application file for complete search history.

(56) References Cited

U.S. PATENT DOCUMENTS

| | | | |
|---|---|---|---|
| 5,524,195 A | 6/1996 | Clanton, III et al. | |
| 5,802,312 A * | 9/1998 | Lazaridis et al. | 709/238 |
| 5,802,361 A | 9/1998 | Wang et al. | |
| 5,825,149 A | 10/1998 | Matsumoto et al. | |
| 5,974,235 A | 10/1999 | Nunally et al. | |
| 6,043,818 A | 3/2000 | Nakano et al. | |
| 6,133,830 A * | 10/2000 | D'Angelo et al. | 340/571 |
| 6,480,121 B1 * | 11/2002 | Reimann | 340/990 |
| 6,798,429 B2 | 9/2004 | Bradski | |
| 6,836,726 B2 | 12/2004 | Sanchez Peiro | |
| 6,987,948 B2 * | 1/2006 | Engstrom et al. | 455/41.1 |
| 7,002,471 B2 | 2/2006 | Geddes et al. | |
| 7,009,497 B2 | 3/2006 | Nicoletti et al. | |
| 7,042,391 B2 | 5/2006 | Meunier et al. | |
| 7,145,454 B2 | 12/2006 | Linjama et al. | |
| 7,148,879 B2 * | 12/2006 | Amento et al. | 345/158 |
| 7,403,744 B2 * | 7/2008 | Bridgelall | 455/41.2 |
| 7,427,926 B2 * | 9/2008 | Sinclair et al. | 340/825.2 |
| 7,512,685 B2 * | 3/2009 | Lunsford et al. | 709/227 |
| 7,738,411 B2 * | 6/2010 | Koponen et al. | 370/315 |
| 7,882,196 B2 * | 2/2011 | Fujii et al. | 709/208 |
| 7,986,917 B2 * | 7/2011 | Ahlgren et al. | 455/41.2 |
| 8,165,523 B2 * | 4/2012 | Makela et al. | 455/41.2 |
| 2002/0123325 A1 * | 9/2002 | Cooper | 455/411 |
| 2004/0179545 A1 | 9/2004 | Erola et al. | |
| 2004/0192383 A1 * | 9/2004 | Zacks et al. | 455/557 |
| 2004/0203381 A1 * | 10/2004 | Cahn et al. | 455/41.2 |
| 2005/0037709 A1 * | 2/2005 | Hwang | 455/66.1 |
| 2005/0110778 A1 | 5/2005 | Ben Ayed | |

(Continued)

FOREIGN PATENT DOCUMENTS

JP 2005-278637 * 9/2005

OTHER PUBLICATIONS

Gellersen, et al, "Multi-Sensor Context-Awareness in Mobile Devices and Smart Artefacts", available at least as early as Nov. 15, 2006, at <<http://www.comp.lancs.ac.uk/~hwg/publ/monet.pdf>>, pp. 1-17.

(Continued)

*Primary Examiner* — Catherine Thiaw
(74) *Attorney, Agent, or Firm* — Lee & Hayes, PLLC (57) ABSTRACT

Methods of controlling the transfer of data between devices are described in which the manner of control is determined by a movement experienced by at least one of the devices. The method involves detecting a triggering movement and determining a characteristic of this movement. The transfer of data is then controlled based on the characteristic which has been identified.

18 Claims, 10 Drawing Sheets

U.S. PATENT DOCUMENTS

| | | | |
|---|---|---|---|
| 2005/0278157 A1* | 12/2005 | Raschke | 703/6 |
| 2006/0005156 A1* | 1/2006 | Korpipaa et al. | 717/100 |
| 2006/0055700 A1 | 3/2006 | Niles et al. | |
| 2006/0092866 A1* | 5/2006 | Kim et al. | 370/310 |
| 2006/0126524 A1 | 6/2006 | Tateson | |
| 2006/0252374 A1* | 11/2006 | Ban et al. | 455/41.3 |
| 2006/0256074 A1* | 11/2006 | Krum et al. | 345/156 |
| 2007/0018800 A1 | 1/2007 | Boss et al. | |
| 2007/0026797 A1* | 2/2007 | Borjeson et al. | 455/41.2 |
| 2007/0032270 A1 | 2/2007 | Orr | |
| 2007/0066323 A1* | 3/2007 | Park et al. | 455/456.2 |
| 2007/0079383 A1 | 4/2007 | Gopalakrishnan | |
| 2007/0120832 A1* | 5/2007 | Saarinen et al. | 345/173 |
| 2007/0146347 A1* | 6/2007 | Rosenberg | 345/173 |
| 2007/0188323 A1 | 8/2007 | Sinclair et al. | |
| 2008/0036591 A1 | 2/2008 | Ray | |
| 2008/0109306 A1 | 5/2008 | Maigret et al. | |
| 2008/0120294 A1 | 5/2008 | Davis | |
| 2008/0166966 A1* | 7/2008 | Hamasaki et al. | 455/41.2 |
| 2008/0174550 A1* | 7/2008 | Laurila et al. | 345/158 |
| 2008/0195735 A1 | 8/2008 | Hodges et al. | |
| 2009/0088077 A1* | 4/2009 | Brown et al. | 455/41.2 |

OTHER PUBLICATIONS

Hazas, et al., "A Relative Positioning System for Co-located Mobile Devices", available at least as early as Nov. 15, 2006, at <<http://www.teco.edu/~krohn/ultrasound.pdf>>, pp. 1-14.

Hinckley, "Bumping Objects Together as a Semantically Rich Way of Forming Connections between Ubiquitous Devices", available at least as early as Nov. 15, 2006, pp. 1-2.

Hughes, et al, "MESH: Supporting Mobile Multi-modal Interfaces", available at least as early as Nov. 15, 2006, at <<http://www.sarc.qub.ac.uk/~somodhrain/palpable/162_HughesCopyright.pdf>>, ACM, 2004, pp. 1-2.

Kirovski, et al., "The Martini Synch", available at least as early as Nov. 15, 2006, pp. 1-10.

Pallotta, et al., "RoamBlog", available at least as early as Nov. 15, 2006, at <<http://diuf.unifr.ch/pai/research/welcome/RoamBlog/RoamBlog.pdf>>, pp. 1-16.

Rekimoto, et al., "Proximal Interactions: A Direct Manipulation Technique for Wireless Networking", available at least as early as Nov. 15, 2006, at <<http://www.csl.sony.co.jp/person/rekimoto/papers/int3.pdf>>, pp. 1-8.

Stajano, et al., "The Resurrecting Duckling: Security Issues for Ad-hoc Wireless Networks", available at least as early as Nov. 15, 2006 Springer Verlag Berlin Heidelberg, 2000, pp. 1-12.

"TechFest Live", retrieved on Oct. 25, 2006, at <<5. http://research.microsoft.com/displayArticle.aspx?id=1410>>, pp. 1-2.

Non-Final Office Action for U.S. Appl. No. 12/330,020, mailed on Jun. 24, 2011, David Kirk, "Digital Media Retrieval and Display" 15 pages.

Salminen, et al., "Enhancing Bluetooth Connectivity with RFID", retrieved on Sep. 29, 2008 at <<http://ieeexplore.ieee.org/stamp/stamp.jsp?arnumber=01604790>>, IEEE International Conference on Pervasive Computing and Communications (PERCOM), 2006, pp. 1-6.

"Slashdot, Shake a Secure Bluetooth Connection", retrieved on Oct. 3, 2008 at <<http://mobile.slashdot.org/article.pl?sid=07/11/17/1231254>>, 2008, pp. 1-10.

Office Action for U.S. Appl. 12/330,020, mailed on Dec. 9, 2011, David Kirk, "Digital Media Retrieval and Display", 14 pgs.

* cited by examiner

MOTION TRIGGERED DATA TRANSFER

BACKGROUND

The user interfaces on many mobile devices are quite limited, with only a small number of user options being displayed at one time. This is a result of the size of the mobile device's display and the basic user input means which is available (e.g. there is only a small number of buttons available and often any cursors are quite basic in their functionality). This can lead to complex menu structures with useful commands, such as one to set up a communication link between a first mobile device and a second mobile device, being buried several levels down in a menu. As a result, some operations may be rarely, if ever, used by many users who are deterred by the complicated menu operations.

Methods have been developed by which a communication link, which may be a secure link, can be established between two devices by holding the two devices together and moving the two devices together in a random motion for several seconds. Through detection of this random motion by both devices, a private key can be generated for use over a communication link between both devices. This provides an easy way for a user to establish a communication link, although further operations, once the link is established, require inputs via the buttons/keys on the mobile device and may still require navigation through many menus.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of controlling the transfer of data between devices are described in which the manner of control is determined by a movement experienced by at least one of the devices. The method involves detecting a triggering movement and determining a characteristic of this movement. The transfer of data is then controlled based on the characteristic which has been identified.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Whilst methods have been proposed to provide a simple method by which a user can set up a communication link between two mobile devices, the initiation of a transfer of data between the devices still requires a user to navigate through a multi-level menu system. Methods of initiating and controlling the transfer of data between devices are described below which do not require such complicated navigation, but instead the motion of one or both of the devices determines how the transfer of data is controlled. In some examples, the method may also be used to control the establishment of the communication link, as described in more detail below.

An Exemplary Method

Figure 1:
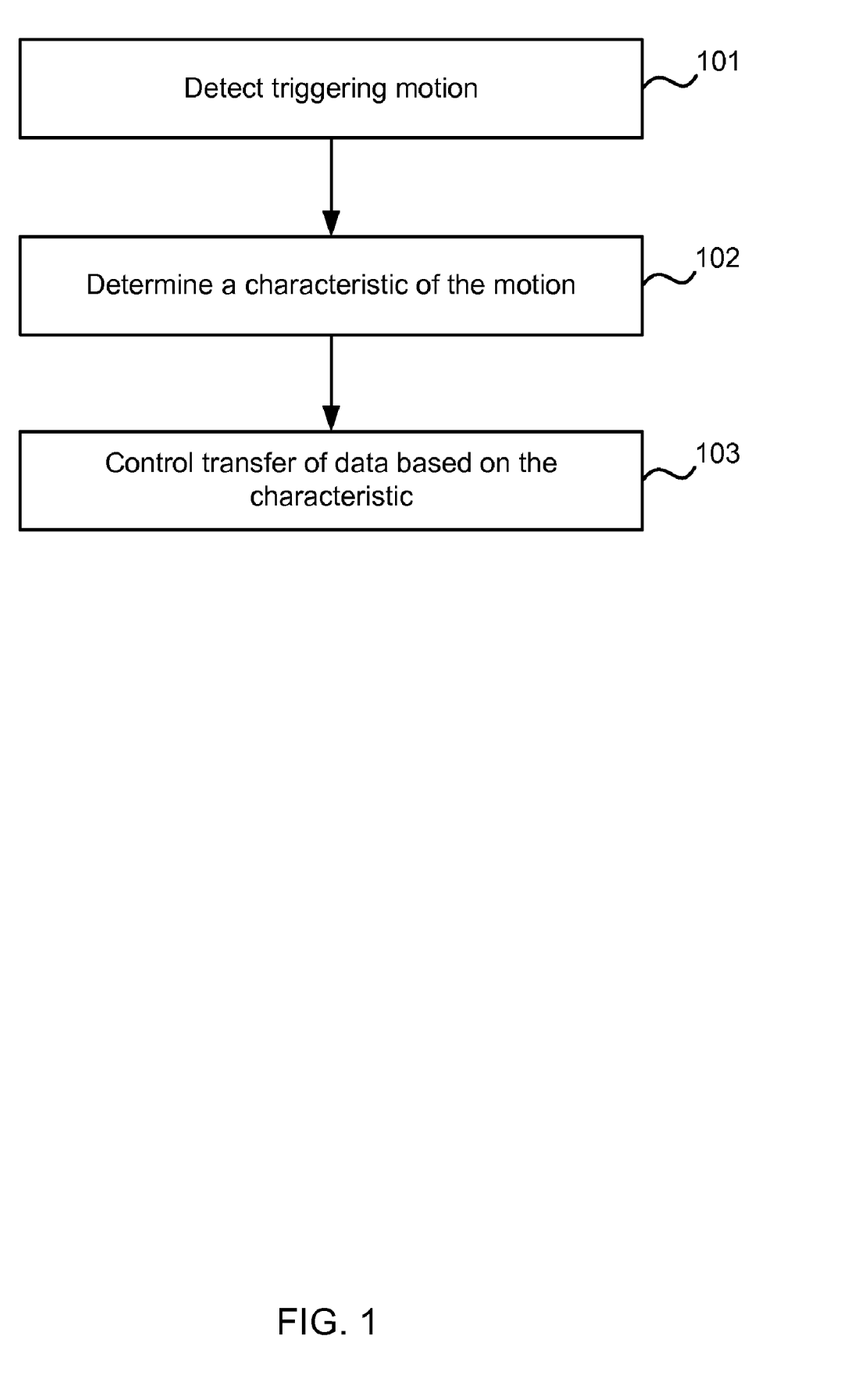
FIG. 1 shows an example flow diagram of a method of controlling the transfer of data between devices.

FIG. 1 shows an example flow diagram of a method of controlling the transfer of data between devices. As shown in FIG. 1, a triggering motion is detected (block 101) by a device, which may be a mobile device such as a mobile telephone, personal digital assistant (PDA), tablet PC etc or a device which is not intended to be mobile such as a printer, scanner, desktop PC, data storage means etc. Examples of suitable devices are described in more detail below. The motion is analyzed to determine a characteristic of the motion (block 102) and the transfer of data between the device and another device is controlled as a result of the determined characteristic (block 103). The motion may be an impact (or bump) caused by bringing the two devices into contact or may be any other motion experienced by the device (e.g. shaking, vibrating etc). The controlling of the transfer of data (block 103) may include the initiation of the transfer of data or this may be separately triggered.

Examples of suitable characteristics of the motion which may be used include, but are not limited to, the orientation of the device(s), the role of the device in the motion (e.g. being bumped or bumping against another device), the location on the device of an impact (or bump), the direction of the motion, the nature of the motion (e.g. modulation of the motion, number of bumps, the force detected, gestures in combination with bumps etc) and/or any combination of one or more of these characteristics. In some examples the characteristics may be determined based on aspects of the motion detected at one device or alternatively the characteristics may be determined based on aspects of the motion detected at more than one device (e.g. at both devices). In some examples, the transfer of data may be controlled based on characteristics detected at one of the devices and in other examples, transfer of data may be controlled based on characteristics detected at both devices. The characteristic may be determined by the device from a plurality of candidate characteristics which have been predefined.

Whilst FIG. 1 and subsequent examples described below show detection of a single characteristic, more than one characteristic may be detected and a combination of characteristics may be used in determining how the transfer of data is controlled.

Aspects of the data transfer which may be controlled according to the detected characteristic(s) include, but are not limited to, the direction of transfer, the selection of the data to be transferred (e.g. data type, selection of the data set), properties of the data stream (e.g. the data rate), starting, stopping and pausing the transfer, changing the data being transferred (e.g. skipping to the next data file, resending the previous data file etc) and the nature of the association between the devices involved in the transfer (e.g. which device controls the transfer, which device holds the master of any data being exchanged, whether the data is pulled or pushed etc). In some examples, the data transfer may be asynchronous, such that the data transfer is controlled by setting/modifying access rights to data (e.g. opening up access to specific data) which may subsequently be accessed by another device. In an example, a first triggering motion may cause a device to become discoverable by other devices and to flag certain files as available for sharing.

The data transferred, which may be selected based on the detected characteristic (as described above), may comprise a file such as a document, an image, a web page, an email etc. In other examples, the data may comprise a pointer to information (such as a URL or file location) or control data. In further examples, the data may comprise any combination of these (e.g. an email and an image, a URL and a document etc). In an application, data such as account data, may be transferred to another device upon detection of a particular triggering motion such that the triggering motion provides an additional security feature—without knowledge of this motion the account data will not be transferred.

This relationship (or mapping) between the characteristic determined (e.g. in block 102 or subsequent examples) and the manner in which the transfer of data is controlled (e.g. in block 103 or subsequent examples) may be stored in a look-up table or any other means. The data which specifies the manner in which the transfer of data is controlled may be referred to as a 'control parameter'. The mappings between candidate characteristics (i.e. those characteristics which may be identified in relation to the triggering motion) and control parameters may be fixed (e.g. by a device manufacturer or a device driver developer), may be user specified (e.g. using a custom element within the user interface) or may comprise a combination of fixed mappings and user-definable mappings. The mappings may change dependent on context (e.g. what the user is doing, the status or location of the device etc) or may be context independent. The mappings may, in some examples, be dependent on the other device(s) involved in the transfer, for example, different mappings may be used when transferring data from a camera to a printer compared to transferring data from the camera to a PC or to another camera.

The method of FIG. 1 may be repeated during the transfer of data between devices, with a first triggering motion initiating the transfer and a subsequent triggering motions stopping the transfer or changing the transfer (e.g. data rate, data being transferred etc). In an example, the first triggering motion may comprise a bump contact which initiates the transfer and the second triggering motion may be a separation of the two devices (e.g. as detected by a proximity sensor or a measurement of the signal strength) which causes the transfer to stop.

Whilst in many examples, the data transfer may be over a wireless communication link, for example using Bluetooth, WiFi, optical or Infra-red technologies, the data transfer may be over a wired link (e.g. over a data cable connected to the device or via electrical contact between the devices). In other examples, the data may be transferred by SMS (short message service), MMS (multimedia messaging service) or email.

Several different examples of the method of FIG. 1 are described in more detail below. It will be appreciated that aspects of these different examples may be combined in any way with aspects of other examples or with FIG. 1 to create further examples of the method of FIG. 1.

Further Exemplary Methods

Figure 2:
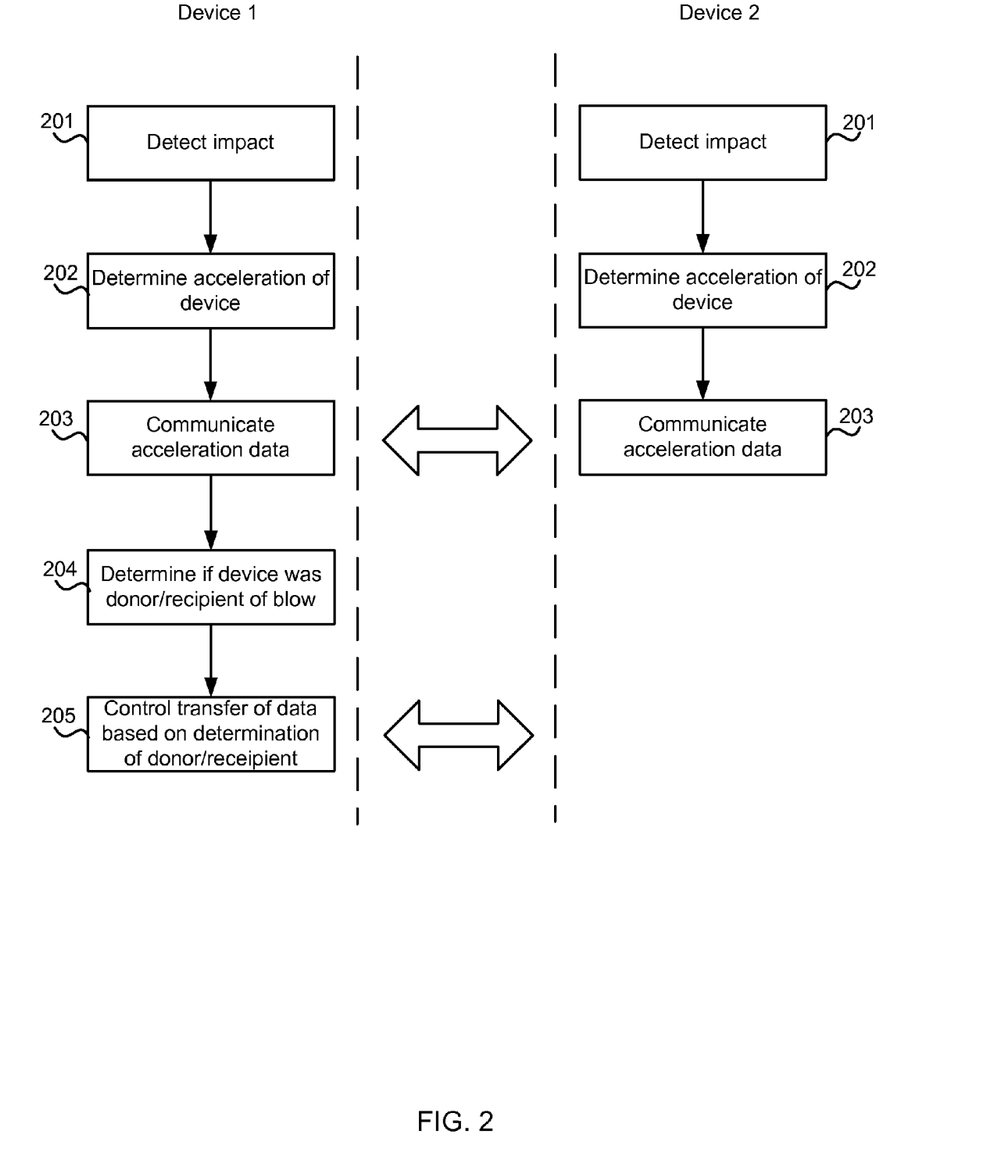
FIG. 2 shows a second example flow diagram of a method of controlling the transfer of data between devices.
Figure 3:
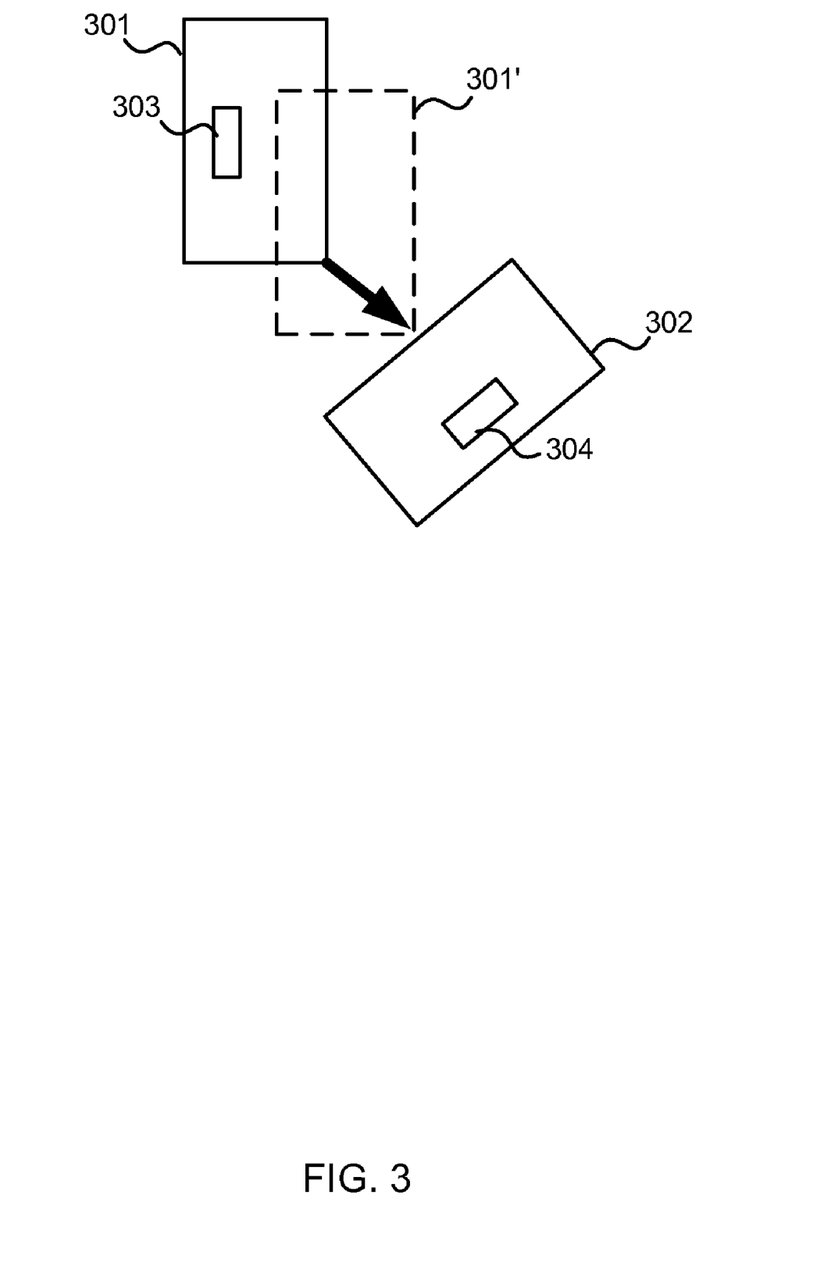
FIG. 3 shows a schematic diagram of two devices being brought into contact.

FIG. 2 shows an example of the method of FIG. 1 in which the triggering motion is an impact and in which the transfer of data is controlled based on whether the device was the donor of the blow which caused the impact (or 'bumper') or recipient of the blow which caused the impact (or 'bumpee'). An example situation is shown in FIG. 3 in which a first device 301 is moved from a first position shown by the solid line to a second position 301' shown by a dashed line such that it is brought into contact with a second device 302. In this scenario, the first device is the donor of the blow (or bumper) and the second device is the recipient of the blow (or bumpee).

As shown in FIG. 2, the impact may be detected by both devices (block 201) and both devices may detect the acceleration/deceleration at the time of impact (block 202). The acceleration/deceleration may be detected using an accelerometer or other sensor 303, 304 located within one or both devices. This acceleration/deceleration data may be communicated between devices (block 203) to enable a device (e.g. device 1) to determine whether it was the donor or recipient of the blow (block 204). This determination may, in one example, be based on the following criterion:

device with greatest deceleration=donor

However, in other examples, other criteria may be used. In the example of FIG. 3, device 1 is determined to be the donor and device 2 is determined to be the recipient and based on this determination, the device (e.g. device 1) may then control the transfer of data between the devices involved (block 205). For example, device 1 may control the transfer of data by causing data to flow from the donor to the recipient or by establishing the donor as holding the master copy in an exchange of data (e.g. such that where data of the same name already exists, the copy held by the donor has priority).

It will be appreciated that the position of the sensors 303, 304 shown in FIG. 3 are by way of example only. In some examples, the position of the sensor within a device may affect the movement which is detected.

Although in FIG. 2, the determination of whether the device is a donor or recipient (block 204) is performed at only one of the devices (device 1) based on data generated at both devices (in block 202) and then shared (block 203), in other examples more than one device, or all the devices involved in a data transfer may make this determination of their participation in the motion event (e.g. the blow). Furthermore, having made such a determination (in block 204) more than one device or all the devices involved in a data transfer may be involved in controlling the data transfer (block 205). For example, where device 1 determines that it is the donor, it may control the transfer of data by transmitting data to device 2, whilst device 2, having determined that it is the recipient, may control the transfer of data by preparing to receive data from device 1.

Figure 4:
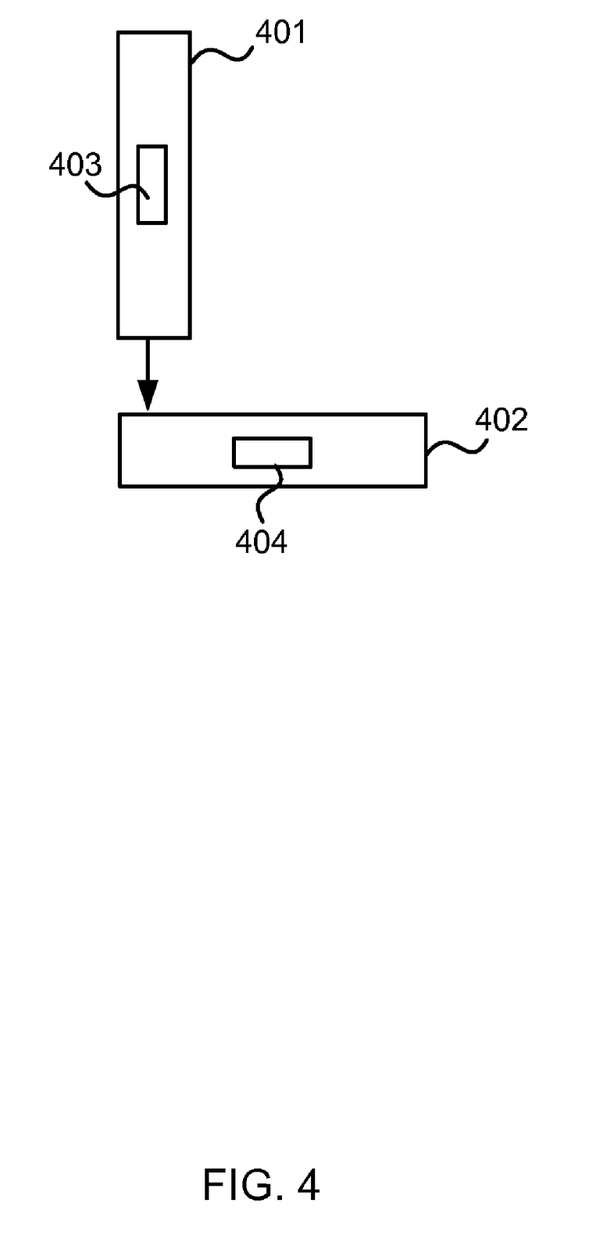
FIG. 4 shows a second schematic diagram of two devices being brought into contact.
Figure 5:
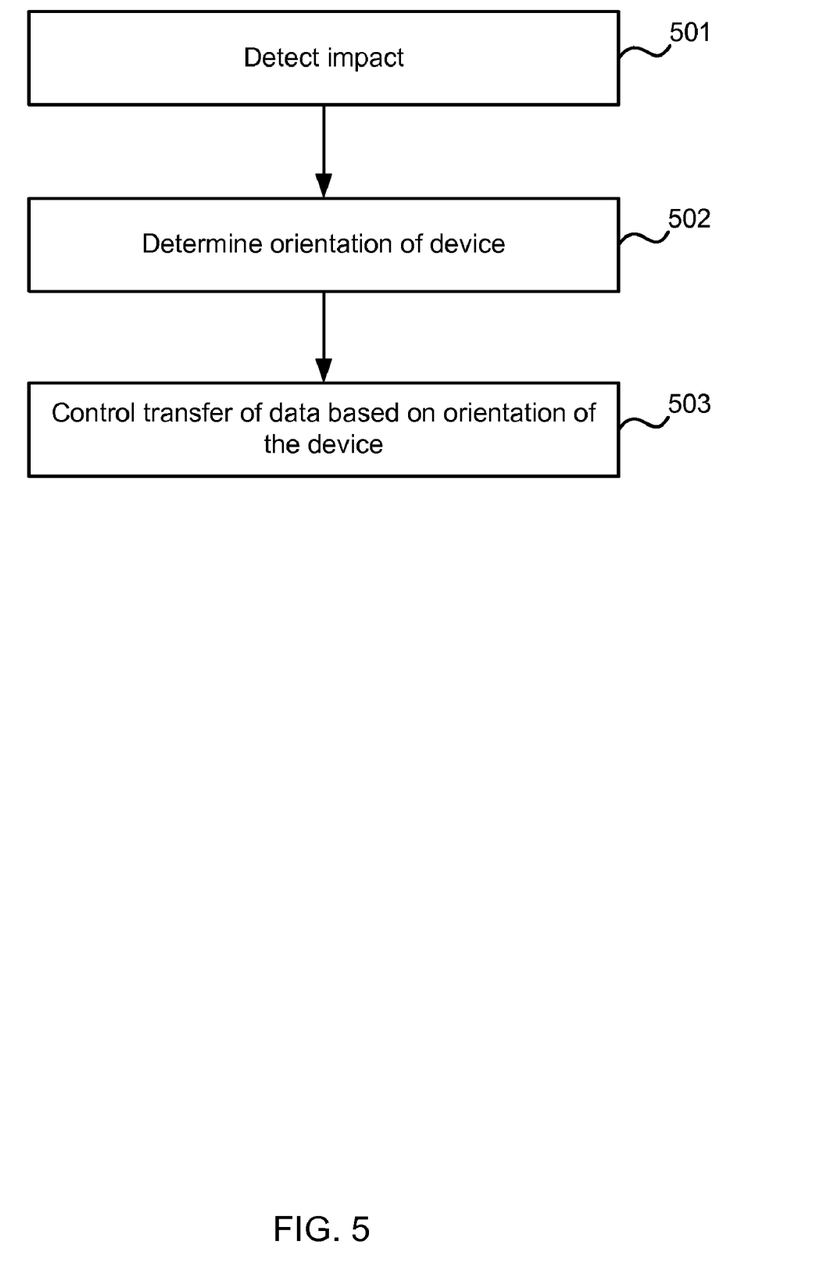
FIG. 5 shows a third example flow diagram of a method of controlling the transfer of data between devices.
Figure 6:
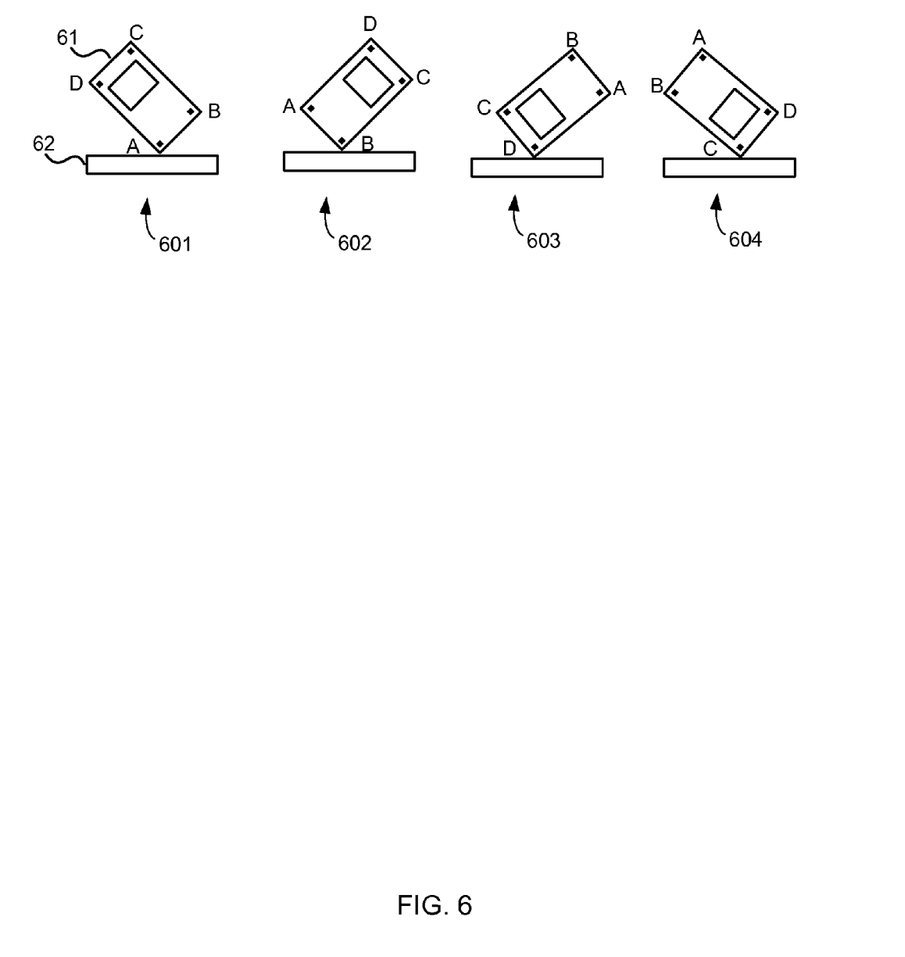
FIG. 6 shows a third schematic diagram of two devices being brought into contact in four different ways.

In another example of the method of FIG. 1, the control of the transfer of data may be based on the orientation of one or more of the devices involved in the transfer, as shown in FIGS. 4-6. FIG. 4 shows a schematic diagram of an example scenario where a first device 401 is tapped against a second device 402. The first device 401 is in a vertical orientation whilst the second device 402 is in a horizontal orientation. Either or both devices 401, 402 may detect an impact (block 501) and determine an orientation of that device (block 502). This determination may use one or more sensors 403, 404 within the device, such as a three-axis accelerometer. Based on this determination, either or both devices may control the transfer based on the determined orientation (block 503). For example, the orientation may determine the direction of the flow of data, e.g. the flow may be from the vertical device 401 into the horizontal device 402.

In another example, the orientation may determine what data is transferred; for example, consider the two devices 61, 62 shown in FIG. 6, where the first device 61 is in a vertical plane but orientated such that one of its corners (labeled A-D) is tapped against the second device 62 which is in a horizontal plane. In the first scenario 601, a first corner A is brought into contact with the second device and detection of this particular orientation may cause a first data set to be transferred to the second device from the first device. In the other scenarios 602-604, the other corners are brought into contact with the second device and each different orientation may cause different data sets to be transferred to the second device. In an example, the different data sets may comprise different types of data (e.g. images, audio files, contact data etc) or the different data sets may comprise different files or different groups of files etc.

In order to determine the orientation of a device, the device may comprise one sensor (as shown in FIG. 4) or many sensors. A suitable device is described in more detail below.

Figure 7:
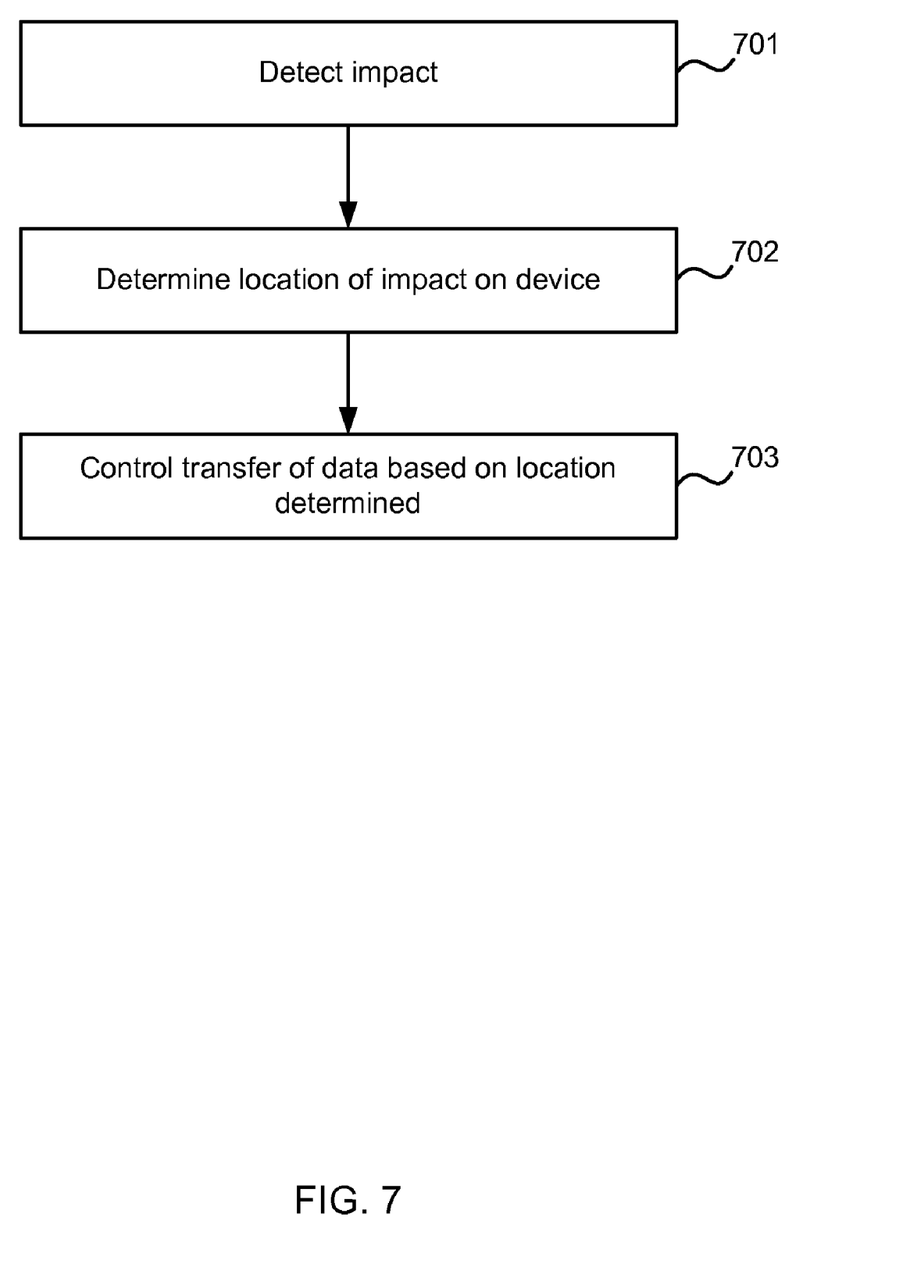
FIG. 7 shows a fourth example flow diagram of a method of controlling the transfer of data between devices.

In another example of the method of FIG. 1, the control of the transfer of data may be based on where the impact is detected on the device (e.g. which corner/side/panel of the device), as shown in FIGS. 6 and 7. Depending on the sensor arrangement used (i.e. number, type and location of sensors), the impact may be detected with different resolutions. With a large device having several substantially isolated panels (e.g. panels on a printer), a microphone may be mounted on each panel such that the impact can be isolated to the particular panel. FIG. 6, as described above, shows four schematic diagrams 601-604 of two devices 61, 62 being brought into contact. In the examples shown, different parts of the first device 61 are brought into contact with the same part of the second device 62 in each of the four scenarios. In this example, the first device may detect the impact (block 701) and determine where the impact occurred (block 702). As with orientation detection, the device may use one or more sensors to detect where the impact occurred. In an example, the device may comprise one or more light sensors (e.g. a light sensor at each corner) which detect an impact based on light levels (rather than motion/vibration). When the two devices are brought into contact, the light sensor may be obscured and this lack of light may be detected and interpreted as an impact. The control of transfer of data between the devices may then be controlled based on the determined location (block 703). In an example, the location of the impact (or the location where the impact was detected) may determine the direction of the flow of data and in another example, it may determine what data is transferred. Other examples of how the transfer may be controlled as described above and below.

Figure 8:
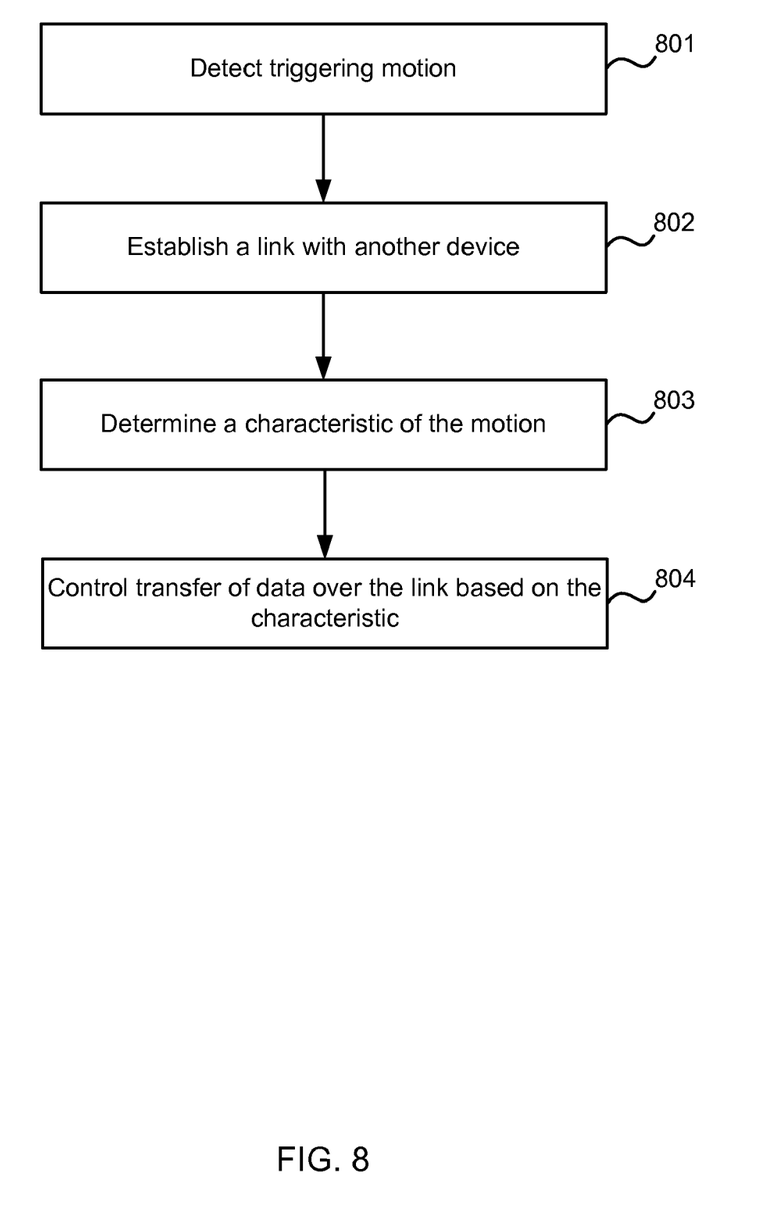
FIG. 8 shows a fifth example flow diagram of a method of controlling the transfer of data between devices.

The methods described above and shown in FIGS. 1, 2, 5 and 7 do not show a separate pairing operation where a communication link is established between the devices. This pairing operation may occur within the controlling block (e.g. within blocks 103, 205, 503 and 703) or may occur prior to or in parallel with the methods described. In some examples, a pairing operation may not be required. FIG. 8 shows an example method in which, following detection of a triggering motion (block 801), a link is established with another device (block 802). A characteristic of the motion is determined (block 803) and then the transfer of data over the link is controlled based on the characteristic determined (block 804). Whilst in FIG. 8, the same motion is used to establish the link and as a triggering motion (detected in block 801), in other examples, the link may be established by means other than a movement of the devices or different movements may be used to establish the link and to trigger the methods described herein. The communication over the link may be secure (e.g. encrypted with a private key) or may be unencrypted.

Figure 9:
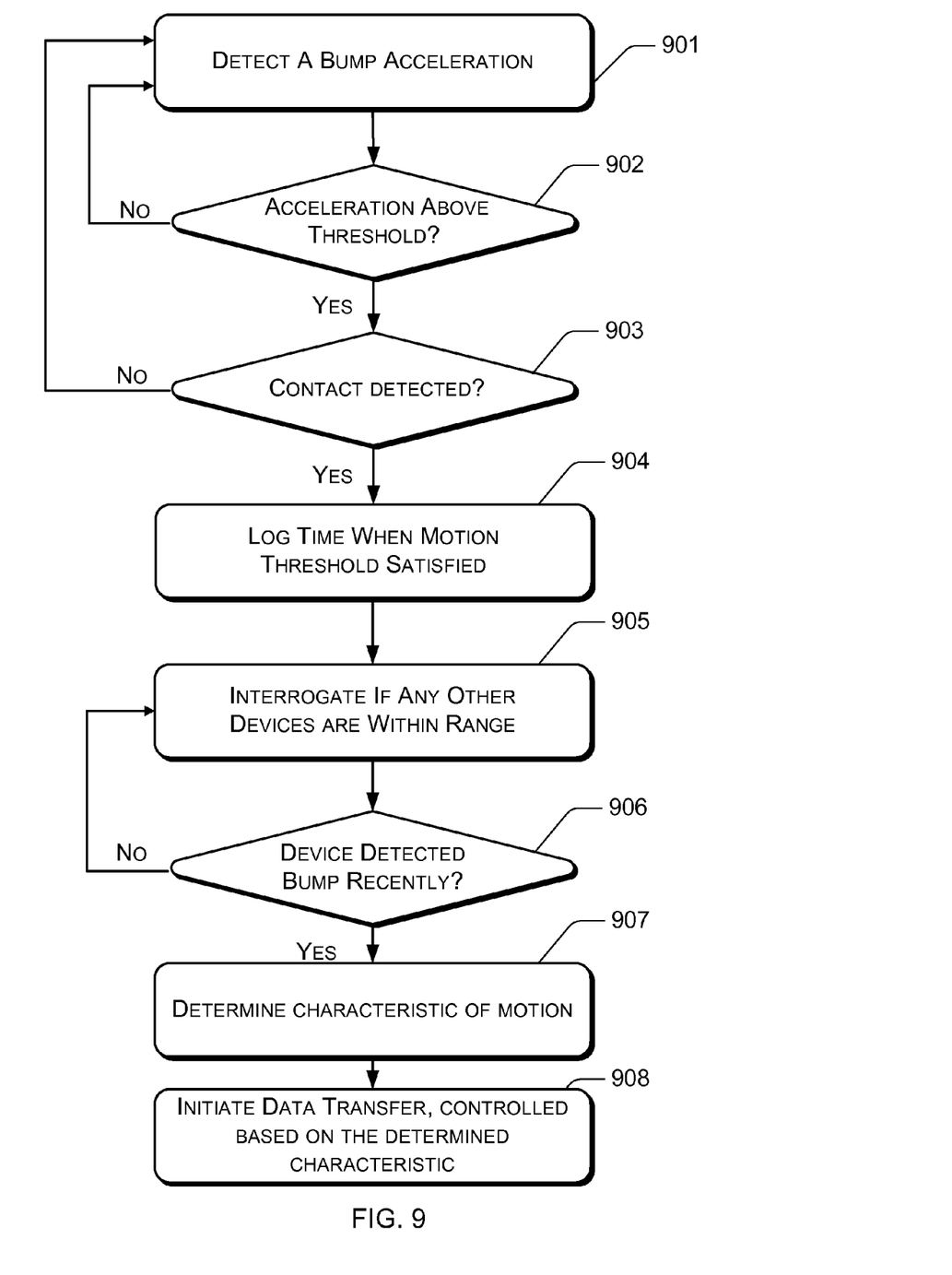
FIG. 9 shows a sixth example flow diagram of a method of controlling the transfer of data between devices.

The pairing operation may use the motion experienced by the devices to establish a link, as described in co-pending U.S. application Ser. No. 11/275,757 entitled "Motion Detection Notification" filed 26 Jan. 2006, which is incorporated herein by reference. FIG. 9 shows a method of pairing devices and controlling the transfer of data using the pairing technique described in this co-pending application. Acceleration from a bump is detected (block 901), for example when two devices 301, 302 are bumped together as shown in FIG. 3 and an acceleration of each device caused by the bump can be detected by the sensors 303, 304 in each device. A determination is made as to whether the acceleration from the bump exceeds a preset threshold (block 902). If the detected acceleration does not exceed the preset threshold (i.e., "no" path from block 902), then method returns to block 901 and waits to detect the acceleration from another bump. If the detected acceleration does exceed the preset threshold (i.e., "yes" path from block 902), then the method continues to block 903. A determination may also be made as to whether contact has been made with another device, another sensor, and/or a user (block 903). If it is determined that no contact has been made (i.e., "no" path from block 903), then the method returns to block 901 and waits to detect the acceleration from another bump. If, however, it is determined that contact was made (i.e., "yes" path from block 903), then a time when the bump occurred which created the contact and/or the acceleration exceeding the threshold (block 902) is logged (block 904). For example, a timestamp can be created by a timer within the device at the time the acceleration is detected to exceed the threshold or at the time the contact has been made.

Once a triggering motion has been detected (as in blocks 901-903), interrogation occurs (block 905) to determine if any other device capable of wireless communication is within communication distance. For example, the interrogation may include a discovery communication transmitted using technologies promulgated by groups such as the Bluetooth Special Interest Group, the Infrared Data Association (IRDA), and the Near Field Communication Forum (NFC). If a device is identified within range, they are queried to determine if they have detected a bump recently (block 906). The term 'recently' may be predefined to be anywhere from fractions of a second to more than a few minutes, and may depend on the communication capabilities of the devices. For example, if the devices are such that they do not have accurate timers, 'recently' may be preset to mean within several minutes of one another. This may be reduced if the devices also share their local times. Alternatively, if the devices are mobile phones with timers synchronized to a very accurate clock, 'recently' could be preset to be only a fraction of a second. If the communicating device did not experience a bump, or the bump was not experienced "recently" (i.e., "no" path from block 906), the method queries other devices (block 905). If the communicating device did experience a bump "recently" (i.e., "yes" path from block 906), then it is inferred that the device shared the same bump that created the acceleration (detected in block 901). A characteristic of the bump is determined (block 907) and data transfer is initiated with the device(s) that shared the bump, with the data transfer being controlled according to the determined characteristic (block 908).

In order to establish a link with another device (block 802), the triggering motion (detected in block 801) may cause the device to change its operation to make itself more open to discovery/communication. In addition to, or instead of, this change of operation, the device may make changes to assist another device in identifying the other devices which experienced the same motion. These changes may increase the power consumption of the device; however this may be traded off against any reduction in delay in establishing a link and/or any reduction in the communication required to establish the link.

In a first example, where devices discover each other through detection of a paging signal, the triggering motion may cause the device to increase the frequency with which it transmits the paging signal. This would increase the speed with which a nearby device would detect its paging signal and may therefore reduce the delay between the triggering motion and the establishment of a link between the devices.

In a second example, the transmission time of the paging signal may be set according to the time of the triggering motion. For example, if the paging signal is sent every 2 seconds, the clock may be reset (e.g. t=0 at the time of the triggering motion) such that the next paging signal is sent out 2 seconds after the triggering motion. This means that devices need only listen for a short period of time for paging signals from devices which experienced the same triggering motion. In the example above, if paging signals are not detected within around 2 seconds of the triggering motion, then they are not likely to originate from devices having experienced the same motion. The listening time may be required to accommodate any likely difference between device clocks (e.g. a device may listen for 3 seconds, rather than 2 seconds where all clocks are expected to be synchronized to within 1 second).

In a third example, on detection of the triggering motion the device may change the name which it makes visible to other devices for a limited period of time (e.g. for one minute). For example, the device may change its name from 'DeviceA' to 'DeviceA_T' to indicate that it has detected a triggering motion. After the predetermined period of time, the name may revert back to its original name ('DeviceA'). This name change may then be used by other devices to limit which devices are interrogated (e.g. in block 905). For example, a device may identify those devices in proximity and identify their device names. Where a nearby device has a name which indicates that it has recently experienced a triggering motion (e.g. a name ending in '_T'), the nearby device may be interrogated further but those devices with standard names may not be interrogated.

In another example, the new device name may include a timestamp for the triggering motion (e.g. DeviceA_ 13.18.45') therefore enabling other devices to limit still further which devices are interrogated to determine if they experienced a similar motion. For example, only those devices with timestamps within a particular range may be interrogated and the size of the range may be determined by the degree of synchronization between device clocks.

In another example, the triggering motion may cause the transmitter and/or receiver circuits of the device to be activated or the sensitivity of the receiver to be adjusted, e.g. one device may be passive (e.g. an RFID tag embedded in a device) and one device may be active (e.g. an RFID reader) and the triggering motion may cause the active device to activate its reading circuits (e.g. when the device with the embedded tag is tapped against the RFID reader) and read the tag.

It will be appreciated that aspects of any of these examples may be used in combination with aspects of any one or more of the other examples, e.g. changing the visible name in combination with increasing the frequency with which paging signals are emitted.

In order to detect a triggering motion (e.g. in blocks 101, 201, 501, 701 and 801), the device may monitor substantially all motion for candidate bumps and then use pre-defined criteria to determine whether an identified candidate bump is a triggering motion. As described above and in co-pending U.S. application Ser. No. 11/275,757 this determination may be based on a threshold (e.g. an acceleration threshold, as shown in block 902 of FIG. 9) which when exceeded indicates that the candidate bump is a triggering motion. In a further example, monitoring for candidate bumps may not occur all of the time but instead motion may only be monitored for candidate bumps only when another device is detected close to the device (e.g. within range of device to device communication or within a specified distance) or when other criteria are satisfied.

In a first example, where the devices are connected to a network (e.g. cellular telephones, PDAs, laptops or tablet PCs which are connected to a cellular network or to a local access point), a device may monitor for the signals (such as paging signals) transmitted by devices to the local access point (e.g. to a cellular base station or wireless hotspot). Where such signals are detected or where their strength exceeds a threshold, this indicates that another device is nearby and the device may start monitoring for candidate bumps. Use of a threshold may be particularly beneficial where the range of the signals being detected is large (e.g. paging signals being transmitted to a cellular base station) in order to limit the identification of devices to those which are within a certain distance. By limiting the periods of time where monitoring of motion occurs, this reduces the power consumption of the device which increases battery life (for battery powered devices). The monitoring for paging signals may be achieved using a very lower power radio receiver (or a standard radio receiver in a low power mode) which may initiate a wake-up signal to cause the monitoring of motion when paging signals are detected.

In a second example, the devices may monitor for the presence of an electrical or magnetic field and when detected this may cause the device to start monitoring for a candidate motion.

Where devices are arranged to transfer data over a wired link, rather than a wireless link, alternative techniques may be used to determine when other devices are connected to the device and therefore when to monitor for candidate bumps. Such techniques may be based on a paging signal transmitted over the wireless link.

In controlling the transfer of data, the device may cause data to automatically be transferred between devices. In an example, this data may comprise graphical user interface (GUI) data for one of the devices. For example, where a mobile device, such as a PDA, is tapped against a second device, which may not have a display or have a limited display (such as a single line LCD), the data transferred may comprise GUI data for the second device. This may enable a user to interact with the second device via the GUI displayed on the first device and buttons/keys on either of the devices. In an example, this may provide detailed information about the status of the second device which could not be displayed on the second device due to lack of or limited display capabilities. This may be particularly beneficial for maintenance purposes where the GUI is required infrequently.

Whilst the above examples show the data transfer involving only two devices, this is for explanation purposes only and the data transfer may involve any number of devices. In such examples, the methods described above may operate on one or more of the devices involved in the transfer. Where more than two devices are involved, the control of transfer of data (e.g. in blocks 103, 205, 503, 703, 804 and 908) may comprise establishing a pico-net and then one or more devices broadcasting/multicasting data over the pico-net. In other examples, other types of network may be established or alternatively, the many devices may communicate over point to point links between each pair of devices. Where more than two devices are involved in the data transfer, they may not all have experienced the same triggering motion or the triggering motion at the same time. For example, a device may be brought into contact with a number of devices in sequence and the device may then establish a pico-net comprising all those devices which it was brought into contact with.

Whilst the above examples relate to devices being brought into contact such that the triggering motion is an impact, this is by way of example only. In another example, the devices may be brought into proximity and moved together or moved with respect to each other. The devices may detect that they are close to another device using the methods described above or any other device and the devices may determine that they have been moved together through communication of movement data between devices which are close to each other. In an example, a motion may be detected as a triggering motion (e.g. in blocks 101, 201, 501, 701, 801 and 901) where communication between two or more proximate devices identifies that they all experienced substantially the same (or corresponding) motion (e.g. in a corresponding manner to detection of the same bump as described above in relation to FIG. 9). In an example scenario, a number of mobile devices may be located on a table top (e.g. a number of laptop computers in a meeting room) and an impulse (e.g. a blow) applied to the table top. All the devices experience a similar motion as a result of the impulse and this may be determined through communication between the devices of the motion data. As a result, a characteristic of the motion may be determined (e.g. which device had the largest amplitude of motion and was therefore closest to the blow) and the transfer of data between the devices controlled based on this characteristic (e.g. the device closest to the blow transmits data to the other devices). In another example, the characteristic detected may be the location of the impulse detected by each device (i.e. the face in contact with the table) and this may indicate that the devices should share business card data (i.e. the location affects the actual data which is transferred).

In another example of a non-contact triggering motion, two or more devices may be brought into proximity and only one may experience the triggering motion causing it to transfer data to the other device(s). In a first example, a device (e.g. a digital camera) may be shaken above a second device (e.g. a printer) and the detection of the shaking may cause images from the camera to be transferred to the printer. In this example, the triggering motion may comprise the shaking whilst candidate bumps (or candidate motion) is only detected whilst a second device is in proximity or the triggering motion may comprise a combination of the shaking and the detection of another device in proximity. In a second example, where a number of devices are located on a surface such as a table top, one device may vibrate and the other devices detect the vibration. The detected vibration may cause the devices to transmit data such as contact data to the vibrating device, or to all those devices in proximity. In this example, the triggering motion may comprise the vibration with candidate motion only being detected whilst a second device is in proximity or the triggering motion may comprise a combination of the vibration and the detection of another device in proximity.

In a further example, a combination of a bump and non-contact motion may be used, e.g. a bump in combination with a gesture (e.g. tapping a second device with a first device and then moving the first device in a particular way in front of a proximity sensor on second device).

Exemplary Computing-Based Device

Figure 10:
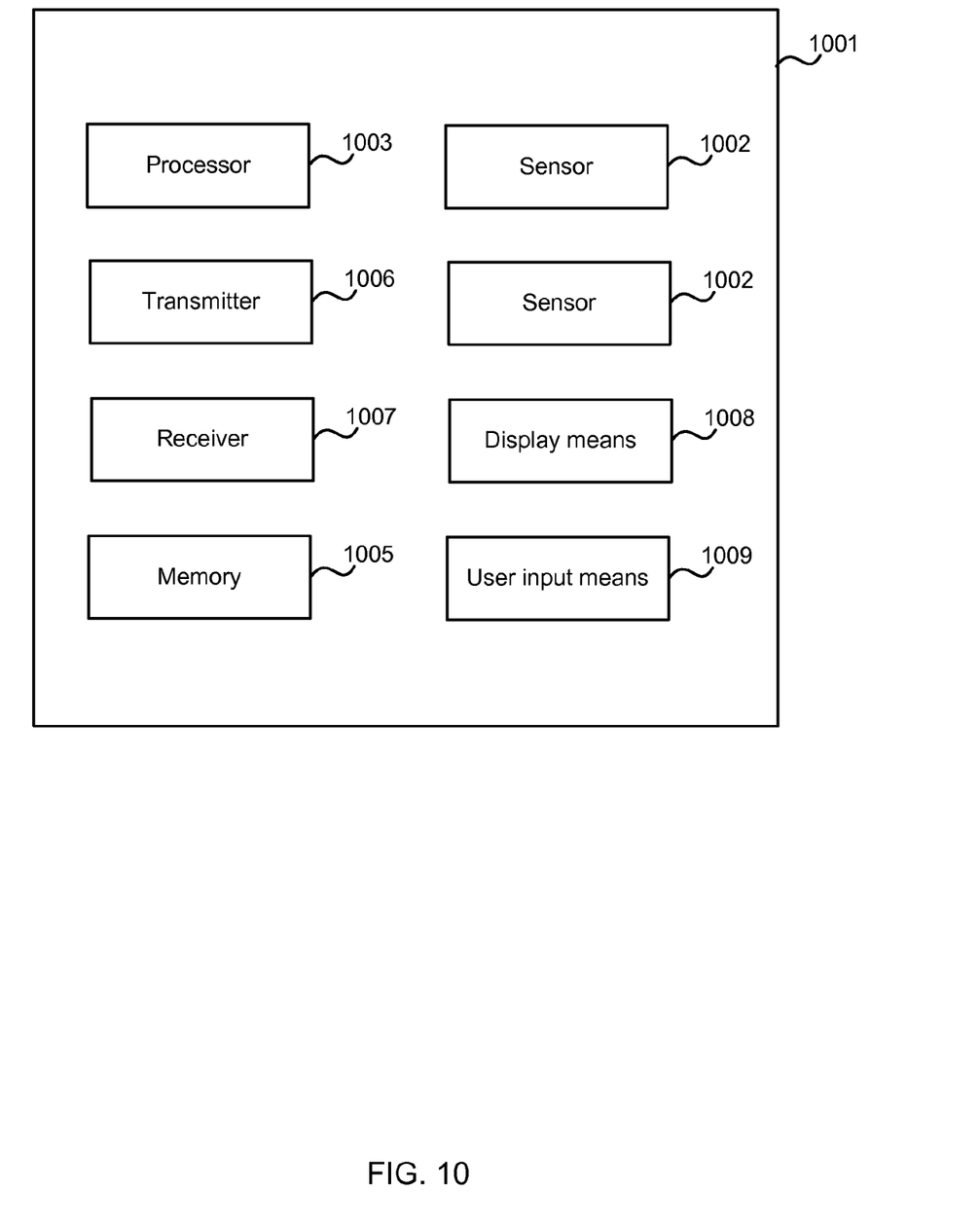
FIG. 10 illustrates an exemplary computing-based device in which embodiments of the methods described herein may be implemented.

FIG. 10 illustrates various components of an exemplary computing-based device 1001 which may be implemented as any form of a computing and/or electronic device, and in which embodiments of the methods described above may be implemented.

The computing-based device 1001 comprises one or more sensors 1002 which may be used to detect the triggering motion. Examples of suitable sensors include, but are not limited to accelerometers (e.g. MEMS based accelerometers), light sensors, microphones, vibration detectors, motion detectors (e.g. spring based detectors), magnetic sensors, cameras, pressure sensors, proximity sensors (e.g. a capacitive proximity sensor) and switches. The sensor used may be selected based upon the type of motion or magnitude of motion to be detected or based on any other factor. The sensors may be self-contained or may interact with external devices (e.g. external beacons). A device may comprise a combination of different types of sensors or several sensors of the same type. In a first example, the device may comprise a single three-axis accelerometer. In further examples, the device may comprise: two accelerometers (e.g. one at each end of the device), four accelerometers (e.g. one at each corner of the device) or a single accelerometer and a number of light sensors (e.g. one at each end or corner of the device). As described above, the location of the sensor(s) within the device may affect the motion that is detected by that sensor.

Computing-based device 1001 also comprises one or more processors 1003 which may be microprocessors, controllers or any other suitable type of processors for processing computing executable instructions to control the operation of the device in order to detect motion and control the transfer of data. Platform software comprising an operating system 1004 or any other suitable platform software may be provided at the computing-based device to enable application software (not shown in FIG. 10) to be executed on the device.

The computer executable instructions may be provided using any computer-readable media, such as memory 1005, which may also store any platform software (as shown in FIG. 10). The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory 1005 may also store the mapping data between the determined characteristics and the details of the manner in which the data transfer is controlled, also referred to as control parameters. This mapping data may be stored in a look-up table, for example, having the form:

| Characteristic of motion | Control parameter |
|---|---|
| Impact detected at sensor a | Transfer image files |
| Impact detected at sensor b | Synchronize all user files |
| Impact detected at sensor c | Transfer business card information |
| Impact detected at sensor d | Pause the transfer of data |

The memory may also be used to store the sensor data which relates to the triggering motion. This information may provide a record of the motion experienced by the device and the devices to which data was transferred as a result of the triggering motion. This record may be particularly beneficial where the data transferred is private (such as account information) and where the triggering motion acts as a security feature (e.g. in a corresponding manner to a PIN). In addition to the sensor data and details of the devices involved in the transfer, data received from the other devices may also be recorded to provide additional confirmation of their involvement.

The device may further comprise a transmitter 1006 and receiver 1007 (which may be combined in the form of a transceiver) for transmitting and receiving data, where the transfer of data is controlled by any of the methods described herein. The receiver 1007 may also, in some examples, be used to detect devices in proximity (as described in more detail above) or a separate low power receiver may be provided (not shown in FIG. 10). The transmitter and receiver may also be used for other communication, such as communication with a network. The transmitter and receiver may use wireless technology or wired technology and the device may comprise one or more different transmitters and receivers which may use different communication technologies, media and/or protocols.

The device may also comprise a display means 1008, such as an LCD display or an output to an external display (such as a monitor) and user input means 1009, such as buttons, a keypad, a joystick or an input from an external device (such as a keyboard). In some examples the display means 1008 and the user input means 1009 may be combined (e.g. in the form of a touch sensitive screen). Where a display is provided, the processor may provide a graphical user interface.

CONCLUSION

Although the present examples are described and illustrated herein as being implemented in a computing-based device, the device described is provided as an example and not a limitation. As those skilled in the art will appreciate, the present examples are suitable for application in a variety of different types of devices and the methods may be implemented in alternative devices, for example a device where the motion detection function is implemented in hardware.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed in hardware, firmware or by software in machine readable form on a storage medium, or any combination thereof. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein. The methods may be implemented in any suitable hardware, software, firmware or combination thereof.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   detecting a triggering motion event administered or received at a device;
   determining a characteristic of said triggering motion event from a plurality of triggering motion event characteristics, wherein said plurality of triggering motion event characteristics comprises:
   a number of bumps with at least one other device, whether said device has administered a bump against at least one other device comprising said device administering the bump by moving towards and coming in contact with the at least one other device while the at least one other device is stationary, the bump determined based on accelerometer data that indicates acceleration followed by rapid deceleration of said device;
whether said device has received a bump from at least one other device comprising said device being stationary and receiving the impact bump by receiving a contact from the at least one other device, the bump determined based on accelerometer data that indicates a rapid acceleration;
a magnitude of acceleration or deceleration associated with a detected bump; and
a location of an impact with at least one other device, said location of impact comprising a first location of impact or a second location of impact different from said first location of impact;
controlling transfer of data between said device and said at least one other device comprising:
selecting a type of data to be transferred based on the determined triggering motion event characteristic, and
selecting a direction of data flow based on the determined triggering motion event, wherein selecting a direction of data flow comprises determining whether said device transmits data to said at least one other device or whether said at least one other device transmits data to said device.

2. A method according to claim 1, wherein controlling transfer of data between said device and at least one other device further comprises:
accessing a mapping between said determined triggering motion event characteristic and a control parameter; and
controlling transfer of data between said device and at least one other device according to said control parameter.

3. A method according to claim 2, wherein said control parameter comprises at least one of:
a data rate and rules defining a relationship between said device and said at least one other device.

4. A method according to claim 1, wherein said plurality of triggering motion event characteristics further comprises at least one of: an orientation of the device during said triggering motion event, a direction of said triggering motion event and a magnitude of said triggering motion event.

5. A method according to claim 1, wherein controlling transfer of data between said device and at least one other device further comprises:
initiating transfer of data to said at least one other device.

6. A method according to claim 1, further comprising:
establishing a communication link between said device and said at least one other device, and
wherein controlling transfer of data between said device and said at least one other device based on said determined triggering motion event characteristic comprises:
controlling transfer of data between said device and said at least one other device over said communication link based on said determined triggering motion event characteristic.

7. A method according to claim 6, wherein said communication link comprises a wireless communication link.

8. A method according to claim 1, further comprising:
on detection of said triggering motion event, changing an aspect of operation of said device to assist in identification of said device by said at least one other device.

9. A method according to claim 1, wherein determining a characteristic of said triggering motion event comprises:
accessing data relating to said triggering motion event administered or received at said device;
receiving data relating to said triggering motion event from said at least one other device; and
analyzing said data administered or received at said device and said data received from said at least one other device to determine a characteristic of said triggering motion event.

10. A method according to claim 1, further comprising:
monitoring for devices located in proximity to said device; and
on detection of said at least one other device in proximity, monitoring motion of said device.

11. A method according to claim 1, wherein said device is a mobile device.

12. A method according to claim 1, wherein the plurality of triggering motion event characteristics further comprises a predetermined location on said device of an impact with at least one other device.

13. A method according to claim 1, wherein:
the determined triggering motion event characteristic comprises the location of an impact with the at least one other device; and
selecting a type of data to be transferred based on the determined triggering motion event characteristic comprises:
selecting a first type of data to be transferred if said location of impact comprises said first location of impact; and
selecting a second type of data to be transferred if said location of impact comprises said second location of impact.

14. One or more device-readable storage memories, storing device-executable instructions for data transfer that, when executed, configure a processor to perform acts comprising:
detecting a triggering motion administered or received at a device;
determining a characteristic of said triggering motion from a plurality of triggering motion characteristics, wherein said plurality of triggering motion characteristics comprises:
predetermined locations of impacts with at least one other device, said predetermined locations of impacts comprising corners of said device;
whether said device has administered a bump against at least one other device comprising said device administering the bump by moving towards and coming in contact with the at least one other device while the at least one other device is stationary, the bump determined based on accelerometer data that indicates acceleration followed by rapid deceleration of said device;
whether said device has received a bump from at least one other device comprising said device being stationary and receiving the impact bump by receiving a contact from the at least one other device, the bump determined based on accelerometer data that indicates a rapid acceleration;
a magnitude of acceleration or deceleration associated with a detected bump; and
a location of an impact with at least one other device, said location of impact comprising a first location of impact or a second location of impact different from said first location of impact; and
controlling transfer of data between said device and at least one other device based on said determined triggering motion characteristic, wherein controlling said transfer of data comprises:

accessing a mapping between a corner of an impact of said predetermined impact corners and a control parameter; and transferring data between said device and said at least one other device according to said control parameter, said control parameter comprising:

data selection criteria and determining a direction of data flow, wherein said determining said direction of data flow comprises transmitting data from said device in a direction of said at least one other device or transmitting data from said at least one other device in a direction of said device.

15. A device comprising:

at least one sensor at each of four corners of said device;

a data transfer component;

a motion detection and analysis component arranged to detect a triggering motion, to determine a characteristic of said triggering motion, and to control transfer of data by said data transfer component based on said characteristic;

memory storing a plurality of mappings, each mapping being between at least one of a plurality of candidate characteristics and at least one of a plurality of control parameters, said mappings comprising:

an impact detected at a first sensor at a first corner of said device, said impact detected at said first sensor being mapped to a transfer of image files;

an impact detected at a second sensor at a second corner of said device, said impact detected at said second sensor being mapped to a synchronization of user files;

an impact detected at a third sensor at a third corner of said device, said impact detected at said third sensor being mapped to a transfer of business card information; or an impact detected at a fourth sensor at a fourth corner of said device, said impact detected at said fourth sensor being mapped to a pause in a transfer of data; and wherein said motion detection and analysis component is configured to:

select a sensor at said first, second, third, or fourth corner of said device based on a detected impact;

access said mapping between said sensor at said first, second, third, or fourth corner of said device and at least one control parameter; and control transfer of data by said data transfer component based on said control parameter, said control parameter comprising:

data selection criteria and determining a direction of data flow, wherein said determining said direction of data flow comprises transmitting data from said device in a direction of at least one other device or transmitting data from said at least one other device in a direction of said device.

16. A device according to claim 15 wherein said data transfer component comprises a transmitter and a receiver.

17. A device according to claim 15 wherein said motion detection and analysis component comprises a processor.

18. A device according to claim 15 wherein said at least one sensor comprises one of: a motion sensor, an accelerometer, a microphone, a light sensor, a vibration detector, a camera, a pressure sensor, a proximity sensor, a switch and a magnetic sensor.

* * * * *